J. H. STOUT AND LE ROY C. PLATER.
DIRIGIBLE LIGHT.
APPLICATION FILED DEC. 6, 1919.
1,366,217.
Patented Jan. 18, 1921.
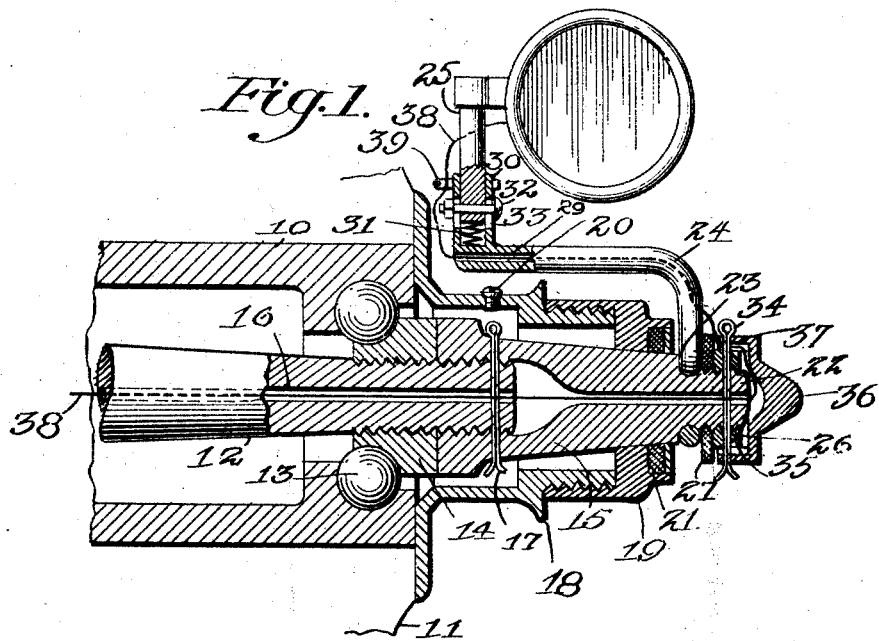
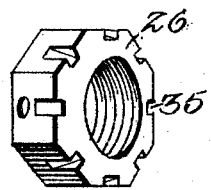
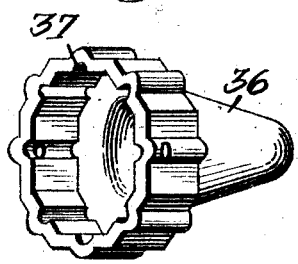
Inventors.
John H. Stout and
Le Roy C. Plater.
by Chas. J. O'Neill.

UNITED STATES PATENT OFFICE.

JOHN H. STOUT AND LE ROY C. PLATER, OF SCRANTON, PENNSYLVANIA.

DIRIGIBLE LIGHT.

1,366,217.  Specification of Letters Patent.  Patented Jan. 18, 1921.

Application filed December 6, 1919. Serial No. 342,979.

*To all whom it may concern:*

Be it known that we, JOHN H. STOUT and LE ROY C. PLATER, citizens of the United States, residing at Scranton, in the county of Lackawanna and State of Pennsylvania, have invented certain new and useful Improvements in Dirigible Lights; and we do hereby declare the following to be a full, clear, and exact description of the invention, such as will enable others skilled in the art to which it appertains to make and use the same.

This invention relates to dirigible lights for automobiles, and particularly to an improvement on the light illustrated and claimed in our Patent No. 1,317,528 dated September 30, 1919.

The particular improvements constituting this invention, reside in the arrangement and in the wiring, of the means for protecting the wiring and of the mounting of the lamp so that it will not be subjected to road shock and by virtue of which construction the life of the lamp will be prolonged to the maximum degree.

In the drawing:

Figure 1 is a sectional view of a device constructed in accordance with our invention, showing the same associated with the spindle of a front axle;

Fig. 2 is a detail of the lock nut; and

Fig. 3 is a detail of the cap.

In the drawing we have illustrated a portion of a hub 10 which carries the spokes 11, and through which the spindle 12 extends. The hub is supported on the spindle by ball bearings 13 which operate in a race 14, the latter being screwed upon the threaded end of the spindle and held in place by a spindle extension 15. The spindle 12 and the extension have alined axial openings 16 therein for the accommodation of the wire which extends to the lamp. The extension is screwed upon the end of the spindle and held in place by a cotter pin 17. To the hub extension 18, a hub cap 19 is secured by means of screw threads, the hub cap being provided with an axial opening through which the spindle extension 15 projects and the hub extension 18 being provided with an oiling opening 20. The oil is prevented from flowing from the opening in the hub cap by means of a washer 21 which tightly engages the spindle extension. The spindle extension 15 is reduced and threaded at its end portion 22, the reduction resulting in a shoulder 23 which is located beyond the end of the hub cap. A lamp bracket, consisting of a body portion 24 which is provided with an eye which slips over the end of the reduced portion of the spindle extension and which abuts against the shoulder and which comprises further a lamp carrying section 25, is provided. The body portion of the lamp bracket extends back over the hub cap and hub extension, and the bracket is secured in place by a lock nut 26 which operates through a washer 27 to bind the bracket against the shoulder 23. The body portion of the bracket includes a horizontal portion through which a wire receiving opening 29 extends longitudinally and constitutes further a vertical tubular portion 30, into which the lamp carrying section projects and is slidably mounted, being held in its uppermost position, normally, by a spring 31, and being guided in its movement by a pin 32 which operates in vertically extending slots 33.

The lock nut 26 is secured in place by a cotter pin 34, and is provided with notches 35 in its edge. Cap 36 is mounted so as to embrace and inclose the lock nut 26, and this cap has a series of channels 37 which are adapted to register with the notches 35 in the lock nut. This cap is, too, secured in place by the cotter pin 34.

The wire 38 extends through the axial openings 16 in the spindle and in the spindle extension and into the cap 36. It thence extends through one of the channels 37, the corresponding notch 35 and into the longitudinal bore 29 in the body portion of the bracket. The wire projects from this bore and is carried to the lamp, being secured to the vertical portion of the bracket by clamp 39.

It will be seen that the carrying of the wire through the spindle extension and thence through the lamp bracket and the protection of the wire by the cap 36, results in an efficient construction. Furthermore, while the wire is protected by the cap, it will not be subjected to chafing and consequent disruption of the insulation, because of the fact that it passes through the channel in the cap and the notch in the lock nut.

Furthermore, the mounting of the lamp so that it will be resiliently held in its uppermost position and the attachment of the wire to the lamp so that vertical movement will be permitted, insures a longer life to the lamp, due to the fact that the road shocks will not be transmitted to the latter. Of course, it is to be realized that there is no spring suspension of the lamp, other than that which is provided in our invention. That is to say, the lamp is mounted directly on the wheel spindle, and therefore all road shocks, to which the wheel is subjected, would be transmitted directly to the lamp, if such a resilient means as we have shown were not provided.

What we claim is:

1. The combination with a channeled wheel spindle extension, having an abutment adjacent to the end thereof, of a lamp bracket mounted on the spindle extension, a nut for clamping the bracket against the abutment and having notches in its edge and a cap adapted to embrace the nut and having channels registering with the notches in the nut.

2. A combination with a channeled spindle extension of a lamp bracket mounted rigidly thereon, said bracket comprising a body member and a lamp carrying member yieldingly mounted on the body member, the latter having a wire receiving channel extending longitudinally therethrough, means for clamping the bracket on the spindle extension, said means having channels communicating with the channel of the extension, and a wire extending through the channels of the spindle extension, the clamping means and the lamp bracket.

In testimony whereof we affix our signatures, in presence of two witnesses.

JOHN H. STOUT.
LE ROY C. PLATER.

Witnesses:
 L. P. WEDEMAN,
 ANNA C. CLARKE.